United States Patent [19]

Nakazawa et al.

[11] 3,871,958

[45] Mar. 18, 1975

[54] BIOLOGICAL METHOD OF PRODUCING SERINE AND SERINOL DERIVATIVES

[75] Inventors: Hidetsugu Nakazawa, Kawasaki; Hitoshi Enei, Zushi; Koji Kubota, Kawasaki; Shinji Okumura, Tokyo, all of Japan

[73] Assignee: Ajinomoto Co., Inc., Tokyo, Japan

[22] Filed: Feb. 28, 1973

[21] Appl. No.: 336,808

[30] Foreign Application Priority Data
Mar. 4, 1972   Japan.............................. 47-22650
Apr. 13, 1972  Japan.............................. 47-37296

[52] U.S. Cl. ................................................. 195/29
[51] Int. Cl............................................. C12d 13/06

[58] Field of Search ...................................... 195/29

[56] References Cited
UNITED STATES PATENTS
3,755,081   8/1973   Yamade .............................. 195/29

*Primary Examiner*—Lionel M. Shapiro
*Assistant Examiner*—Robert J. Warden
*Attorney, Agent, or Firm*—Hans Berman; Kurt Kelman

[57] ABSTRACT

Serine-derivatives and serinol-derivatives are obtained by the action of an enzyme produced by certain microorganisms, on an aldehyde and glycine or ethanolamine.

10 Claims, No Drawings

BIOLOGICAL METHOD OF PRODUCING SERINE AND SERINOL DERIVATIVES

This invention relates to the production of serine-derivatives and serinol-derivatives by biological methods.

An object of the invention is the production of serine-derivatives and serinol-derivatives by a biological method at low cost from easily available raw materials.

Aromatic L-serine-derivatives and aromatic L-serinol-derivatives are important intermediates for synthesizing epinephrine and norepinephrine. Higher aliphatic $\beta$-hydroxy-L-amino acids are intermediates for synthesis of surface active agents. p-Nitrophenyl-L-serine and p-nitrophenyl-L-serinol may be prepared by the present method as intermediates for synthesis of chloramphenicol.

It has been found that an aldehyde having at least three carbons reacts with glycine or ethanolamine in the presence of an enzyme source prepared by cultivation of microorganisms and, serine-derivatives of formula I and serinol-derivatives of formula II can be produced.

Formula I : 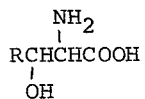

Formula II : 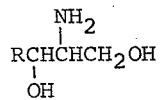

(R is the organic residue having at least two carbons derived from the aldehyde employed.)

The enzyme source may be a broth in which a microorganism is cultivated, or a cell-free filtrate of said broth, intact cells of said microorganism recovered from said broth, an aqueous suspension of ground cells or a filtrate of said suspension. It is believed that the enzyme catalyzing the reaction between the aldehyde and glycine may be a threonine aldolase.

The microorganisms capable of producing said enzyme are distributed very widely, representative microorganisms belonging to the genera Escherichia, Citrobacter, Klebsiella, Aerobacter, Serratia, Proteus, Bacillus, Staphylococcus, Arthrobacter, Bacterium, Xanthomonas, Candida, Debaryomyces, Corynebacterium and Brevibacterium.

The reaction can be carried out by culturing the microorganisms mentioned above in a conventional nutrient medium containing aldehyde and glycine and/or ethanolamine under aerobic condition as usual, or by adding the enzyme source to a reaction mixture containing an aldehyde and glycine and/or ethanolamine.

The media employed for culturing the microorganisms may be conventional, containing sources of assimilable carbon and nitrogen and the usual minor nutrients.

The microorganisms have been grown successfully on media containing carbohydrates such as glucose, fructose, sucrose, mannose, maltose, mannitol, xylose, galactose, starch hydrolyzate and molasses. Organic acids such as acetic acid, citric acid, lactic acid, fumaric acid, malic acid, $\alpha$-ketoglutaric acid, glyconic acid, propionic acid and pyruvic acid, alcohols such as methanol, ethanol, propanol and butanol, fatty acids and hydrocarbons are also useful as main carbon sources or supplemental carbon sources for selected microorganisms. The concentration of the carbon source in the medium is normally between 0.1 and 10 percent by weight, based on glucose equivalents. Nitrogen may be provided by ammonium salts of inorganic or organic acids, such as hydrochloric, sulphuric, phosphoric, nitric, acetic and carbonic acid, by urea, and by ammonia in an aqueous solution or in the gaseous state. Other organic substances containing nitrogen such as corn steep liquor, yeast extract, peptone, meat extract and NZ-amine are employed as supplemental nitrogen sources.

The medium should also contain inorganic salts and minor organic nutrients which promote the growth of the microorganisms. The inorganic salts may include dipotassium hydrogen phosphate, potassium dihydrogen phosphate, magnesium sulphate, sodium chloride, ferrous nitrate, manganese sulfate, zinc sulphate, copper sulfate and calcium carbonate. Known organic growth promoting substances include amino acids generally, biotin, vitamins, organic acids, fatty acids and substances containing protein. They may be supplied by substances which yield the active agent under the conditions of culturing, such as meat extract, peptone, yeast extract, corn steep liquor, skim milk, chlorella extract, and soybean protein hydrolyzate.

In certain cases the activity of said enzyme sources is improved by addition of threonine to the culture medium.

The fermentation is carried out under aerobic conditions, at 25° to 40°C. It is preferred to adjust the pH of the culture medium to 5.5 to 8.5 during cultivation. Culturing is generally carried out for 10 to 72 hours.

The broth may be used as an enzyme source as is without removing the bacterial cells. A cell-free filtrate of the culture broth and a suspension or extract of crushed bacterial cells prepared by trituration, autolysis or ultrasonic oscillation, are also used as the enzyme source of the present invention. Crude enzyme and pure enzyme recovered by centrifuging, salting out and solvent precipitation can also be used.

The present reaction can be carried out by employing saturated aliphatic aldehydes such as propionaldehyde, butyraldehyde, isobutyraldehyde, valeraldehyde, isovaleraldehyde, pivalic aldehyde, caproic aldehyde, heptaldehyde, caprylaldehyde, tridecylaldehyde, myristaldehyde, palmitic aldehyde, etc. and halogen substitution products thereof, aliphatic di-aldehydes such as succinaldehyde, unsaturated aliphatic aldehydes such as acrylaldehyde, crotonaldehyde, propiolaldehyde etc., heterocyclic aldehydes such as furaldehyde, aromatic aldehydes such as benzaldehyde and benzaldehyde-derivatives having one or more substituent groups such as p-nitro benzaldehyde, p-methyl benzaldehyde, p-chloro benzaldehyde, tolualdehyde, salicylaldehyde, cinnamaldehyde, naphthaldehyde etc., formyl-carboxylic acids such as formylacetic acid, phthaladehyde, and ketoaldehydes such as methylglyoxal, phenylglyoxal etc.

The amount of aldehyde in the reaction mixture should be controlled so that the activity of the enzyme is not inhibited, and preferably its range is from 0.1 to 10 percent by weight of the reaction mixture.

In view of the inhibitive action of aldehydes, the aldehydes may also be added gradually during the reaction.

The amounts of glycine and ethanolamine in the reaction system should be equimolar with the aldehyde or in excess for good yield.

The reaction is normally carried out at pH 5 to 10, preferably at pH 7.5 to 8.5, at a temperature of 5° to 60°C, preferably at 10° to 37°C, with stirring or without stirring. In order to maintain the pH value of the reaction system during the reaction, buffer solutions, for example, phosphate buffer, tris buffer and ammonium chloride-ammonia buffer, are employed.

When enzyme sources prepared from culture broth, especially those prepared by treatment of cultivated microbial cells are employed for the present reaction, the reaction may be promoted by addition of pyridoxine, pyridoxal or pyridoxal phosphate. However, they have normally no effect on a reaction carried out during the cultivation.

The reaction of the present invention is also promoted by nonionic anionic, cationic, and amphoteric surface active agents, and preferably by nonionic surface active agents.

The following surface active agents may thus be employed:
cetyltrimethylammonium halide
laurylalcoholsulfonate
alkylarylsulfonate
imidazoline
polyoxyethylene alkyl phenol ether
polyoxyethyene alkyl ether
trispolyoxyethylene sorbitan monoalkylate
sorbitan alkyl aryl ether
alkylamide of fatty acid
polyoxyethylene sorbitan trialkylate
sorbitan alkyl monoester The surface active agents are added to the reaction system in an amount preferably from 0.1 to 0.5 percent by weight.

Serine-derivatives having a substituent in the $\beta$-position and obtained from an aldehyde and glycine include $\beta$-ethylserine, $\beta$-isopropylserine, $\beta$-n-propylserine, $\beta$-butylserine, $\beta$-isobutylserine, $\beta$-neobutylserine, $\beta$-amylserine, $\beta$-caprylserine, $\beta$-palmitylserine, $\beta$-vinylideneserine, $\beta$-phenylserine, $\beta$-$\alpha$-furfurylserine, $\beta$-p-chlorophenylserine, etc. Similarly, serinol-derivatives having substituents in the $\beta$-position are obtained from an aldehyde and ethanolamine.

The reaction products may be recovered by means of ion exchange resin, absorption on and desorption from activated charcoal, soluent extraction and so on.

The isolated serine-derivatives and serinol-derivatives are identified by ninhydrin color development of a paperchromatogram, melting point, IR-spectrum, optical rotation and comparison with a known sample.

The amounts of the derivatives are determined by colorimetrical analysis of the extract from the colored spot on the paperchromatogram.

EXAMPLE 1

An aqueous culture medium was prepared to contain 2.0 g/dl L-threonine, 0.2 g/dl $KH_2PO_4$, 0.1 g/dl $MgSO_4$ and 0.4 g/dl $(NH_4)_2 SO_4$, and was adjusted to pH 5.0. 50 ml Batches of said medium were placed in 500 ml shaking flasks and inoculated with the microorganisms shown on Table 2 which were previously cultured on bouillon agar slants at 31°C for 20 hours, and cultivation was carried out at 31°C for 24 hours with shaking.

The microbial cells in 100 ml of each cultured broth were harvested by centrifuging, washed and suspended in 50 ml of reaction solutions (A), (B), (C) and (D) whose compositions are shown in Table 1 at pH 8.5 and at 31°C for 20 hours.

Table 1

| Composition of the reaction solution | | Reaction solution | | | |
|---|---|---|---|---|---|
| | | (A) | (B) | (C) | (D) |
| p-nitrobenzaldehyde | (g/dl) | 2.0 | 2.0 | — | — |
| isobutyraldehyde | (g/dl) | — | — | 2.0 | 2.0 |
| glycine | (g/dl) | 2.0 | — | 2.0 | — |
| ethanolamine | (g/dl) | — | 2.0 | — | 2.0 |
| SORPOL W-200 | (g/dl) | 0.2 | 0.2 | 0.2 | 0.2 |

SORPOL W-200: Brand name of surface active agent (polyoxyethylene alkyl phenol ether)

B-p-Nitrophenyl-L-serine, $\beta$-p-nitrophenyl-L-serinol, $\beta$-isopropyl-L-serine and $\beta$-isopropyl-L-serinol were produced in solutions (A), (B), (C), and (D) respectively in the yields shown in Table 2.

Table 2

| Microorganisms employed | Yield in each reaction solution (g/dl) | | | |
|---|---|---|---|---|
| | (A) | (B) | (C) | (D) |
| Escherichia coli ATCC 15289 | 0.2 | 0.1 | 0.2 | 0.2 |
| Citrobacter freundii ATCC 6750 | 0.8 | 0.7 | 0.5 | 0.6 |
| Klebsiella pneumoniae ATCC 10031 | 0.5 | 0.4 | 0.3 | 0.3 |
| Aerobacter aerogenes IFO 3319 | 0.1 | 0.1 | 0.2 | 0.1 |
| Aerobacter cloacae IAM 1020 | 0.2 | 0.2 | 0.1 | 0.2 |
| Serratia marcescens ATCC 14223 | 0.9 | 0.8 | 0.7 | 0.6 |
| Proteus vulugaris ATCC 881 | 0.3 | 0.1 | 0.2 | 0.1 |
| Bacillus mesentericus IAM 1026 | 0.2 | 0.1 | 0.3 | 0.2 |
| Bacillus subtilis ATCC 13953 | 0.4 | 0.3 | 0.4 | 0.3 |
| Staphylococcus aureus ATCC 4776 | 0.6 | 0.5 | 0.5 | 0.4 |
| Arthrobacter simplex ATCC 13260 | 0.5 | 0.3 | 0.4 | 0.4 |
| Arthrobacter grobiformis ATCC 4336 | 0.6 | 0.6 | 0.2 | 0.5 |
| Arthrobacter pascens ATCC 13346 | 0.6 | 0.6 | 0.5 | 0.4 |
| Arthrobacter ureafaciens ATCC 7562 | 0.1 | 0.1 | 0.1 | 0.2 |
| Arthrobacter aurescens ATCC 13344 | 0.7 | 0.6 | 0.6 | 0.6 |
| Bacterium cadaveris ATCC 9760 | 0.8 | 0.7 | 0.8 | 0.6 |
| Bacterium succinicum IAM 12090 | 0.4 | 0.3 | 0.4 | 0.3 |
| Xanthomonas campestris IAM 1671 | 0.7 | 0.6 | 0.7 | 0.6 |
| Candida rugosa ATCC 10571 | 0.6 | 0.5 | 0.5 | 0.4 |
| Candida humicola ATCC 14438 | 1.0 | 0.8 | 0.9 | 0.9 |
| Candida utilis ATCC 9950 | 0.7 | 0.6 | 0.5 | 0.4 |
| Candida guilliermondii ATCC 9058 | 0.5 | 0.4 | 0.3 | 0.2 |
| Candida parapsilosis ATCC 7330 | 0.3 | 0.2 | 0.2 | 0.1 |
| Debaryomyces hansenii ATCC 18110 | 0.1 | 0.1 | 0.2 | 0.1 |

EXAMPLE 2

The microbial cells in 10 ml of the broth obtained by cultivation of *Candida humicola* ATCC 14438 as in Example 1 were harvested by centrifuging and suspended in 10 ml batches of the reaction solutions (I) and (II) whose compositions are shown below at 370 for 20 hours.

Reaction solution (I):

| Aldehyde (shown in Table 3) | 2.0 g/dl |
| Glycine | 2.0 g/dl |
| SORPOL W-200 | 0.2 g/dl |
| pH 8.5 (with KOH) | |

Reaction solution (II):

| Aldehyde (shown in Table 3) | 2.0 g/dl |
| Ethanolamine | 2.0 g/dl |
| SORPOL W-200 | 0.2 g/dl |
| pH 8.5 (with KOH) | |

After 20 hours at 37°, a β-substituted-L-serine corresponding to the added aldehyde was produced in the reaction solution (I) and a β-substituted-L-serinol was produced in the reaction solution (II) in yields shown in Table 3.

EXAMPLE 3

Two aqueous culture media were prepared to contain 10 percent glucose, 0.2% (NH$_4$)$_2$SO$_4$, 0.3% NH$_4$NO$_3$, 0.1% KH$_2$PO$_4$, 0.05% MgSO$_4$·7H$_2$O, 200 γ/l biotin, 1 mg/l thiamine.HCl, 1 mg/l folic acid, 2.5 mg/l nicotinamide, 0.1% DL-methionine, 0.6% hydrolyzed soybean protein (total nitrogen 7.0%), 3% glycine or 3% ethanolamine respectively and 5% calcium carbonate, and were adjusted to pH 7.0. 20 ml Batches of the two culture media were placed in 500 ml shaking flasks.

The aqueous media were inoculated with *Corynebacterium glycinophilum* ATCC 21341 previously cultured on bouillon agar slants at 30°C for 40 hours and cultivation was carried out at 30°C with shaking. After 24 hours' cultivation, respective 0.5 percent amounts of the aldehydes shown in Table 4 were added and the cultivation was continued for 48 hours.

Two other aqueous culture media were prepared to contain 10 percent glucose, 1& (NH$_4$)$_2$SO$_4$, 0.2& KH$_2$PO$_4$, 0.04% MgSO$_4$.7H$_2$O, 0.5 percent caseine hydrolyzate, 200 γ/l biotin, 500 γ/l thiamine HCl and 0.5 percent glycine or 0.5% ethanolamine respectively, and were adjusted to pH 7.0. 20 ml Batches of the culture media in 500 ml shaking flasks were inoculated with *Brevibacterium helvolum* ATCC 21342 previously cultured on bouillon agar slants at 32°C for 24 hours and cultivation was carried out at 32°C for 24 hours with shaking. After 24 hours' cultivation, respective 0.5 percent amounts of the aldehydes shown in Table 4 together with 2 percent of glycine or 2 percent of ethanolamine were added and the cultivation was continued for 70 hours.

After the cultivation, β-substituted-L-serine and β-substituted-L-serinol with ethanolamine were produced as shown in Table 4.

One liter of the cultured broth containing β-substituted-L-serine which was obtained by culturing *Corynebacterium glycinophilum* ATCC 21341 in the medium containing 0.5 percent of p-nitrobenzaldehyde was centrifuged to remove the microbial cells and CaCO$_3$. The supernatant solution was applied to a column of cation ion exchange resin, Amberlite IR-120 (H$^+$). The resin was eluted with 1N-aqueous ammonia. The eluate fraction containing the desired product was concentrated, treated with activated charcoal and again concentrated.

When the concentrated solution was mixed with alcohol and permitted to stand, 1.3 g of a crystalline product was obtained.

It was identified as p-nitrophenyl-L-serine by its paper chromatogram, melting point, IR-spectrum and optical rotation.

EXAMPLE 4

The microbial cells in 1 liter of the broth obtained by cultivation of *Candida humicola* ATCC 14438 as in Example 1 were harvested by centrifuging and suspended in 1 liter of a reaction solution containing 30 g glycine, 30 g benzaldehyde, 2 g SORPOL W-200 and 0.1 g pyridoxal-5-phosphate.

After adjustment of adjusting the pH to 8.5, the reaction was carried out at 37°C for 20 hours. 10 Grams of crystalline L-β-phenylserine were recovered from the solution after removal of the microbial cells.

EXAMPLE 5

An aqueous culture medium was prepared to contain 0.2 g/dl L-threonine, 0.5 g/dl yeast extract, 0.2 g/dl KH$_2$PO$_4$, 0.1 g/dl MgSO$_4$ and 0.01 g/dl pyridoxal, and was adjusted to pH 5.0. 50 ml Batches of said medium were placed in 500 ml shaking flasks and inoculated with *Arthrobacter simplex* ATCC 13260 which was previously cultured on bouillon agar slants, and cultivation was carried out at 31°C for 24 hours with shaking.

Ten ml of the cultured broth, the supernatant solution and the microbial cells separated by centrifuging 10 ml of the cultured broth were employed as enzyme sources acting at 30°C for 20 hours on 0.3 g p-nitrobenzaldehyde, 0.3 g glycine and 0.01 g SORPOL W-200. When the microbial cells were employed as the enzyme source, the mixture was filled up to 10 ml with water.

The amounts of p-nitrophenyl-L-serine produced in each reaction are shown in Table 5.

EXAMPLE 6

*Candida rugosa* ATCC 10571 and *Candida humicola* ATCC 14438 were cultured as in Example 1. Each 10 ml batch of culture broth was mixed with 0.2 g p-nitrobenzaldehyde, 0.2 g glycine, 1 mg pyridoxal-5-phosphate and a surface active agent shown in Table 6.

After pH adjustment to 8.5, the reaction was carried out at 30°C for 20 minutes with stirring. The amounts of p-nitrophenyl serine produced are shown in Table 6.

Table 3

| Aldehydes added | Yield (g/dl) | |
| --- | --- | --- |
| | Serine-deriv. | Serinol-deriv. |
| propionaldehyde | 0.1 | 0.3 |
| butyraldehyde | 0.4 | 0.2 |
| isobutyraldehyde | 0.2 | 0.2 |
| valeraldehyde | 0.3 | 0.3 |
| isovaleraldehyde | 0.2 | 0.2 |
| pivalicaldehyde | 0.4 | 0.3 |
| caproaldehyde | 0.1 | 0.2 |
| heptaldehyde | 0.3 | 0.3 |
| caprylic aldehyde | 0.5 | 0.5 |
| pelargonaldehyde | 0.6 | 0.4 |
| capraldehyde | 0.4 | 0.3 |
| undecylaldehyde | 0.5 | 0.4 |
| lauranildehyde | 0.4 | 0.2 |
| tridecylaldehyde | 0.8 | 0.7 |

Table 3-Continued

| Aldehydes added | Yield (g/dl) Serine-deriv. | Yield (g/dl) Serinol-deriv. |
|---|---|---|
| myristaldehyde | 0.3 | 0.2 |
| pentadecylaldehyde | 0.4 | 0.3 |
| palmitaldehyde | 0.6 | 0.5 |
| margaraldehyde | 0.5 | 0.5 |
| stearyl aldehyde | 0.8 | 0.7 |
| glyoxal | 0.1 | 0.2 |
| succinaldehyde | 0.3 | 0.3 |
| acrylaldehyde | 0.1 | 0.2 |
| crotonaldehyde | 0.1 | 0.1 |
| propiolaldehyde | 0.1 | 0.1 |
| trichloroacetaldehyde | 0.2 | 0.2 |
| benzaldehyde | 0.7 | 0.5 |
| furaldehyde | 0.5 | 0.4 |
| p-chlorobenzaldehyde | 0.4 | 0.3 |
| p-bromobenzaldehyde | 0.4 | 0.3 |
| p-tolualdehyde | 0.3 | 0.2 |
| vanillin | 0.5 | 0.5 |
| p-nitrobenzaldehyde | 1.0 | 0.8 |
| 3,4-o-methylbenzaldehyde | 0.8 | 0.7 |
| 3,4-dihydroxybenzaldehyde | 0.8 | 0.7 |
| 2,4-dihydroxybenzaldehyde | 0.7 | 0.6 |
| p-acetylbenzaldehyde | 0.6 | 0.5 |
| p-methylsulfonylbenzaldehyde | 0.5 | 0.4 |
| 3,5-dimethylbenzaldehyde | 0.4 | 0.3 |
| salicylaldehyde | 0.7 | 0.7 |
| 3,4-dibromobenzaldehyde | 0.8 | 0.7 |
| 2,4-dibromobenzaldehyde | 0.7 | 0.6 |
| 3,4-dinitrobenzaldehyde | 0.8 | 0.8 |
| p-aminobenzaldehyde | 0.4 | 0.4 |
| 3,4-diaminobenzaldehyde | 0.5 | 0.4 |
| p-methylthiobenzaldehyde | 0.4 | 0.3 |
| malonic semialdehyde | 0.2 | 0.2 |
| succinic semialdehyde | 0.1 | 0.1 |
| maleic semialdehyde | 0.1 | 0.1 |
| terephthalaldehydic acid | 0.3 | 0.3 |
| 3,4-dichlorobenzaldehyde | 0.5 | 0.4 |
| p-chlorobenzaldehyde | 0.6 | 0.7 |
| β-naphthaldehyde | 0.8 | 0.7 |

Table 4

| Aldehydes added | Coryne. glycinophilum Serine deriv. | Coryne. glycinophilum Serinol deriv. | Brevi. helvolum Serine deriv. | Brevi. helvolum Serinol deriv. |
|---|---|---|---|---|
| propionaldehyde | 0.12 | 0.10 | 0.08 | 0.05 |
| butyraldehyde | 0.10 | 0.12 | 0.07 | 0.06 |
| isobutyraldehyde | 0.14 | 0.09 | 0.09 | 0.06 |
| valeraldehyde | 0.09 | 0.11 | 0.04 | 0.05 |
| isovaleraldehyde | 0.22 | 0.17 | 0.06 | 0.05 |
| pivalic aldehyde | 0.16 | 0.17 | 0.07 | 0.03 |
| caproic aldehyde | 0.13 | 0.08 | 0.08 | 0.09 |
| heptaldehyde | 0.20 | 0.10 | 0.07 | 0.08 |
| caprylicaldehyde | 0.18 | 0.10 | 0.05 | 0.06 |
| pelargonaldehyde | 0.11 | 0.13 | 0.09 | 0.10 |
| capraldehyde | 0.08 | 0.07 | 0.08 | 0.07 |
| undecylaldehyde | 0.07 | 0.08 | 0.04 | 0.05 |
| laurinaldehyde | 0.12 | 0.15 | 0.12 | 0.06 |
| tridecylaldehyde | 0.19 | 0.12 | 0.09 | 0.07 |
| myristaldehyde | 0.17 | 0.14 | 0.07 | 0.08 |
| pentadecylaldehyde | 0.15 | 0.17 | 0.05 | 0.05 |
| palmitaldehyde | 0.07 | 0.08 | 0.03 | 0.08 |
| margaraldehyde | 0.06 | 0.08 | 0.04 | 0.06 |
| stearyl aldehyde | 0.13 | 0.14 | 0.07 | 0.04 |
| succinaldehyde | 0.15 | 0.09 | 0.09 | 0.09 |
| acrylaldehyde | 0.09 | 0.05 | 0.04 | 0.06 |
| crotonaldehyde | 0.12 | 0.08 | 0.04 | 0.05 |
| benzaldehyde | 0.20 | 0.12 | 0.08 | 0.07 |
| furaldehyde | 0.13 | 0.16 | 0.09 | 0.07 |
| p-chlorobenzaldehyde | 0.25 | 0.09 | 0.14 | 0.08 |
| p-bromobenzaldehyde | 0.23 | 0.24 | 0.12 | 0.06 |
| p-tolualdehyde | 0.18 | 0.23 | 0.11 | 0.12 |
| p-nitrobenzaldehyde | 0.30 | 0.25 | 0.15 | 0.11 |
| p-aminobenzaldehyde | 0.33 | 0.30 | 0.09 | 0.13 |
| p-acetylbenzaldehyde | 0.10 | 0.19 | 0.03 | 0.05 |
| p-methylsulfonyl benzaldehyde | 0.13 | 0.14 | 0.04 | 0.06 |
| p-methylthiobenzaldehyde | 0.11 | 0.08 | 0.05 | 0.08 |
| vanilline | 0.28 | 0.24 | 0.11 | 0.13 |
| 2,5-dihydroxybenzaldehyde | 0.35 | 0.20 | 0.10 | 0.08 |

Table 4-Continued

| Aldehydes added | Coryne. glycinophilum Serine deriv. | Coryne. glycinophilum Serinol deriv. | Brevi. helvolum Serine deriv. | Brevi. helvolum Serinol deriv. |
|---|---|---|---|---|
| 3,4-dihydroxybenzaldehyde | 0.16 | 0.09 | 0.09 | 0.08 |
| 2,4-dihydroxybenzaldehyde | 0.22 | 0.21 | 0.12 | 0.12 |
| 3,5-dimethylbenzaldehyde | 0.11 | 0.13 | 0.08 | 0.07 |
| p-dimethylaminobenzaldehyde | 0.44 | 0.20 | 0.20 | 0.14 |
| salicyl aldehyde | 0.14 | 0.08 | 0.10 | 0.09 |
| 3,4-dibromobenzaldehyde | 0.20 | 0.16 | 0.10 | 0.08 |
| 2,4-dibromobenzaldehyde | 0.27 | 0.22 | 0.13 | 0.14 |
| 3,4-dinitrobenzaldehyde | 0.23 | 0.21 | 0.12 | 0.11 |
| 3,4-diaminobenzaldehyde | 0.21 | 0.11 | 0.08 | 0.07 |
| 3,4-dichlorobenzaldehyde | 0.28 | 0.13 | 0.06 | 0.08 |
| 2-carboxybenzaldehyde | 0.24 | 0.22 | 0.05 | 0.05 |
| 3-carboxylbenzaldehyde | 0.22 | 0.21 | 0.16 | 0.10 |
| 4-carboxybenzaldehyde | 0.17 | 0.15 | 0.08 | 0.06 |
| o-phthaladehyde | 0.22 | 0.10 | 0.10 | 0.04 |
| p-phthalaldehyde | 0.13 | 0.09 | 0.11 | 0.08 |
| phenylacetoaldehyde | 0.18 | 0.14 | 0.13 | 0.10 |
| β-naphthaldehyde | 0.12 | 0.16 | 0.07 | 0.05 |
| cinnamaldehyde | 0.28 | 0.20 | 0.09 | 0.12 |
| nicotinaldehyde | 0.20 | 0.13 | 0.10 | 0.03 |
| p-methoxybenzaldehyde | 0.23 | 0.11 | 0.12 | 0.11 |
| 2,5-dimethoxybenzaldehyde | 0.24 | 0.12 | 0.08 | 0.12 |
| 2-methylbenzaldehyde | 0.19 | 0.10 | 0.14 | 0.09 |

Table 5

| Enzyme source | Yield (g/dl) |
|---|---|
| cultured broth | 0.8 |
| supernatant solution | 0.8 |
| microbial cells | 1.0 |

Table 6

| Surface active agent added | Yield (g/dl) C. rugosa | Yield (g/dl) C. humicola |
|---|---|---|
| SORPOL W-200 : 0.1 g/dl | 0.4 | 0.8 |
| SORPOL W-200 : 1.0 g/dl | 0.6 | 1.0 |
| TWEEN 60 : 0.1 g/dl | 0.6 | 0.7 |
| TWEEN 60 : 1.0 g/dl | 0.7 | 0.9 |
| None | 0.2 | 0.3 |

TWEEN 60 : trispolyoxyethylene sorbitanmonopalmitate

What we claim is:

1. A method of producing a serine derivative of the formula

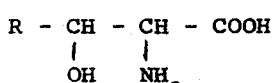

which comprises reacting an aldehyde of the formula R-CHO with glycine in aqueous solution in the presence of an effective amount of a source of an enzyme capable of condensing glycine and the aldehyde at pH 5 to 10 at 5° to 60°C until said serine derivative is formed, and recovering said serine derivative from said solution; in said formulas, R being an organic radical having at least two carbon atoms, said enzyme source being a member of the group consisting of intact and comminuted cells of Escherichia, Citrobacter, Klebsiella, Aerobacter, Serratia, Proteus, Bacillus, Staphylococcus, Arthrobacter, Bacterium, Xanthomonas, Candida, Debaryomyces, Corynebacterium, and Brevibacterium, broth in which said cells have been cultivated, and an extract of said cells.

2. A method as set forth in claim 1, wherein said solution additionally contains pyridoxine, pyridoxaal or pyridoxal phosphate.

3. A method as set forth in claim 1, wherein said solution additionally contains surface active agent.

4. A method as set forth in claim 1, wherein said microorganism is *Escherichia coli* ATCC 15289, *Citrobacter freundii* ATCC 6750, *Klebsiella pneumoniae* ATCC 10031, *Aerobacter aerogenes* IFO 3319, *Aetobacter cloacae* IAM 1020, *Serratia marcescens* ATCC 14223, *Proteus vulugaris* ATCC 881, *Bacillus mesentericus* IAM 1026, *Bacillus subtilis* ATCC 13953, *Staphylococcus aureus* ATCC 4776, *Arthrobacter simplex* ATCC 13260, *ARthrobacter grobiformis* ATCC 4336, *Arthrobacter pascens* ATCC 13346, *ARthrobacter ureafaciens* ATCC 7562, *Arthrobacter aurescens* ATCC 13344, *Bacterium succinicum* IAM 12090, *Xanthomonas campestris* IAM 1671, *Candida rugosa* ATCC 10571, *Candida humicola* ATCC 14438, *Candida utilis* ATCC 9950, *Candida guilliermondii* ATCC 9058, *Candida parapsilosis* ATCc 7330, *Debariomyces hancenii* ATCC 18110, *Corynebacterium glycinophilum* ATCC 21341 anad *Brevibacterium helvolum* ATCC 21342.

5. A method as set forth in claim 1, wherein said aldehyde is a saturated aliphatic aldehyde, a halogen substitution product of said saturated aliphatic aldehyde, an aliphatic di-aldehyde, an unsaturated aliphatic aldehyde, a heterocyclic aldehyde, an aromatic aldehyde, a formylcarboxylic acid, or a ketoaldehyde.

6. A method as set forth in claim 1, wherein said aldehyde amounts to 0.1 to 10 percent of the weight of said solution, and said glycine amounts to at least one mole per mole of said aldehyde.

7. A method as set forth in claim 1, wherein said enzyme is threonine aldolase.

8. A method as set forth in claim 1, wherein said aldehyde is an aromatic aldehyde.

9. A method as set forth in claim 8, wherein R is nitrophenyl.

10. A method as set forth in claim 9, wherein R contains more than three carbon atoms.

* * * * *